(12) United States Patent
Steinbach et al.

(10) Patent No.: US 8,025,309 B2
(45) Date of Patent: Sep. 27, 2011

(54) CURTAIN AIRBAG

(75) Inventors: Mark A. Steinbach, Clawson, MI (US); Sandi M. Trovato, Bruce Township, MI (US)

(73) Assignee: TK Holdings Inc., Auburn Hills, MI (US)

(*) Notice: Subject to any disclaimer, the term of this patent is extended or adjusted under 35 U.S.C. 154(b) by 163 days.

(21) Appl. No.: 12/318,841

(22) Filed: Jan. 9, 2009

(65) Prior Publication Data
US 2009/0179405 A1 Jul. 16, 2009

Related U.S. Application Data

(60) Provisional application No. 61/006,387, filed on Jan. 10, 2008.

(51) Int. Cl.
*B60R 21/213* (2006.01)
(52) U.S. Cl. .................. 280/730.2; 280/743.2
(58) Field of Classification Search .............. 280/730.2, 280/743.2
See application file for complete search history.

(56) References Cited

U.S. PATENT DOCUMENTS

| | | | |
|---|---|---|---|
| 2006/0017267 A1* | 1/2006 | Fink | 280/730.2 |
| 2007/0075530 A1* | 4/2007 | Yokoyama | 280/730.2 |
| 2007/0210561 A1* | 9/2007 | Yamagiwa et al. | 280/730.2 |
| 2008/0012275 A1* | 1/2008 | Pinsenschaum et al. | 280/730.2 |
| 2008/0054606 A1* | 3/2008 | Mitsuo et al. | 280/730.2 |
| 2008/0258442 A1* | 10/2008 | Quach et al. | 280/730.2 |
| 2009/0079172 A1* | 3/2009 | Messner et al. | 280/730.2 |
| 2009/0179405 A1* | 7/2009 | Steinbach et al. | 280/730.2 |
| 2010/0007121 A1* | 1/2010 | Mendez | 280/730.2 |
| 2010/0025971 A1* | 2/2010 | Steinbach et al. | 280/729 |

* cited by examiner

*Primary Examiner* — Paul N Dickson
*Assistant Examiner* — Karen A. Beck
(74) *Attorney, Agent, or Firm* — Foley & Lardner LLP

(57) ABSTRACT

An airbag module for use in a vehicle includes a gas generator and a side airbag coupled to the gas generator and configured to deploy upon receiving gas from the gas generator. The side airbag includes a main body extending along a ceiling of the vehicle configured to restrain a head of a vehicle occupant when the airbag is deployed and an extended portion extending from the main body in a downwards direction and configured to restrain at least a portion of a torso of the vehicle occupant when the airbag is deployed. The extended portion is at least partially tucked into the main body and the airbag is folded in a Z pattern and rolled when the airbag is installed. The tuck of the extended portion and the folds of the main body control the deployment angle of the main body and extended portion.

15 Claims, 5 Drawing Sheets

CURTAIN AIRBAG

CROSS-REFERENCE TO RELATED APPLICATIONS

This application claims priority to and the benefit of U.S. Provisional Application No. 61/006,387, filed Jan. 10, 2008, the entirety of which is herein incorporated by reference.

BACKGROUND

The present disclosure relates to a curtain airbag or curtain-like airbag that is deployed along the side of the interior of a vehicle, and more specifically, to a curtain airbag with a geometry that is configured to more effectively retain an occupant inside the vehicle.

Curtain airbag designs typically offer protection to the vehicle occupant's head. In the future, it is expected that curtain airbags will be required to be longer in the vertical direction and also offer mitigation against occupant ejection during rollover. These requirements are expected to include a requirement for the inflated airbag to extend to a position below the beltline of the vehicle, and also to offer protection for the occupant's head.

It would be advantageous to provide a curtain airbag that provides additional protection for the vehicle occupant by incorporating an extension to the curtain airbag which provides inflated coverage as low as the occupant's torso to cushion the occupant's torso from the intruding surfaces of the vehicle's door and side structures.

SUMMARY

One embodiment of the disclosure relates to an airbag module for use in a vehicle. The airbag module includes a gas generator and a side airbag coupled to the gas generator and configured to deploy upon receiving gas from the gas generator. The side airbag includes a main body extending along a ceiling of the vehicle configured to restrain a head of a vehicle occupant when the airbag is deployed and an extended portion extending from the main body in a downwards direction and configured to restrain at least a portion of a torso of the vehicle occupant when the airbag is deployed. The extended portion is at least partially tucked into the main body and the airbag is folded in a Z pattern and rolled when the airbag is installed. The tuck of the extended portion and the folds of the main body control the deployment angle of the main body and extended portion.

Another embodiment of the disclosure relates to a side airbag for use in a vehicle. The airbag includes a main body extending along a ceiling of the vehicle configured to restrain a head of a vehicle occupant when the airbag is deployed, an extended portion extending from the main body in a downwards direction and configured to restrain at least a portion of a torso of the vehicle occupant when the airbag is deployed, and a tether coupled to an inboard side of the main body and to a vehicle frame or to another portion of the airbag. The tether is configured to control the deployment angle of the main body and extended portion. The extended portion is at least partially tucked into the main body and the airbag is folded in a Z pattern and rolled in an inboard or outboard direction when the airbag is installed. The tuck of the extended portion and the folds of the main body further control the deployment angle of the main body and extended portion.

Another embodiment of the disclosure relates to a side airbag for use in a vehicle. The side airbag includes a main body extending along a ceiling of the vehicle configured to restrain a head of a vehicle occupant when the airbag is deployed and an extended portion extending from the main body in a downwards direction and configured to restrain at least a portion of a torso of the vehicle occupant when the airbag is deployed. The extended portion is at least partially tucked into the main body and the airbag is folded in a Z pattern and rolled when the airbag is installed. At least a portion of the airbag is rolled at an angle matching the angle between the vehicle ceiling and a vehicle frame.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DESCRIPTION

Figure 1:
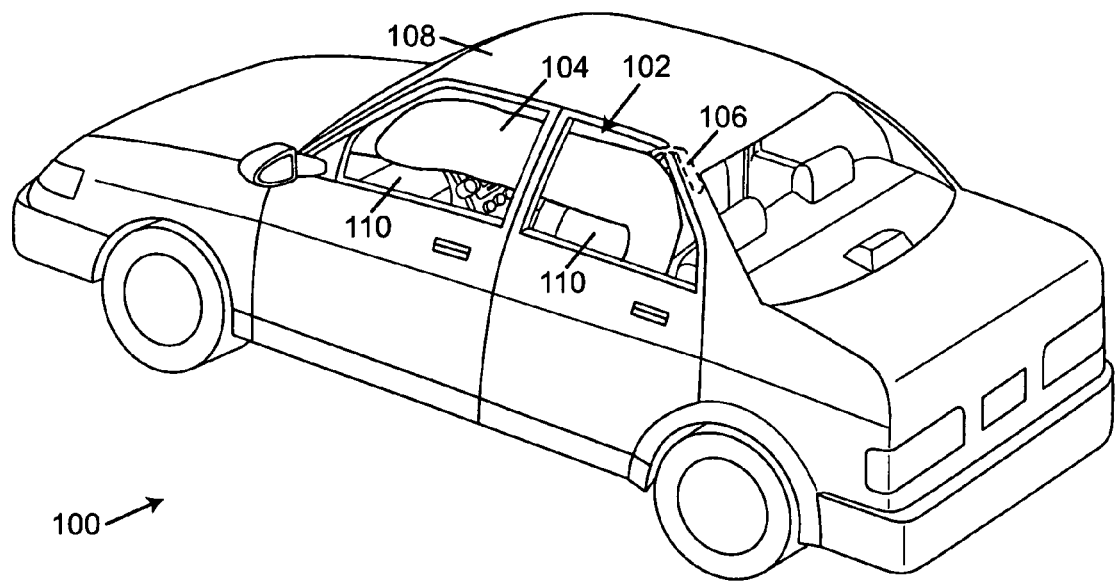
FIG. 1 is an isometric view of a vehicle showing a side curtain airbag according to an exemplary embodiment.

Referring to FIG. 1, a vehicle 100 is shown including a side curtain airbag 102 according to an exemplary embodiment. The side curtain airbag 102 is provided to help protect the occupants of the vehicle in a side impact. The airbag 102 includes an inflatable cushion 104 and an inflator or gas generator 106. The cushion is preferably stored along a roof 108 of the associated vehicle 100, for example, along the vehicle roof rail or frame above a window 110, in a conventional manner. The cushion 104 is preferably secured in a folded state beneath a piece of trim. The trim panel may be snapped, screwed, or otherwise fastened or secured in place over the installed, folded cushion. The inflator 106, for example a conventional pyrotechnic inflator or stored gas inflator, supplies gas for inflation/deployment of the restraint cushion 104. During a vehicle crash or rollover event, the inflator 106 is activated to supply pressurized gas to inflate the cushion 104. The inflation gas enters the cushion 104 and drives the cushion 104 away from the storage position and downward into the deployed position (illustrated). In the deployed position, the cushion 104 is disposed between the occupant and the side of the vehicle and generally covers at least a portion of the windows 110. The cushion 104 may help to retain or restrain the occupant within the vehicle 100 and reduce the chance of the occupant being ejected from the vehicle 100 through the window 110.

The airbag cushion 104 is generally formed with two panels of a suitable material such as nylon. The panels are coupled together with a sewn or woven seam to form at least one inflatable chamber. The cushion may be divided into two or more chambers. Passages or ports are generally formed between individual chambers so the chambers are in fluid communication with each other.

Figure 2:
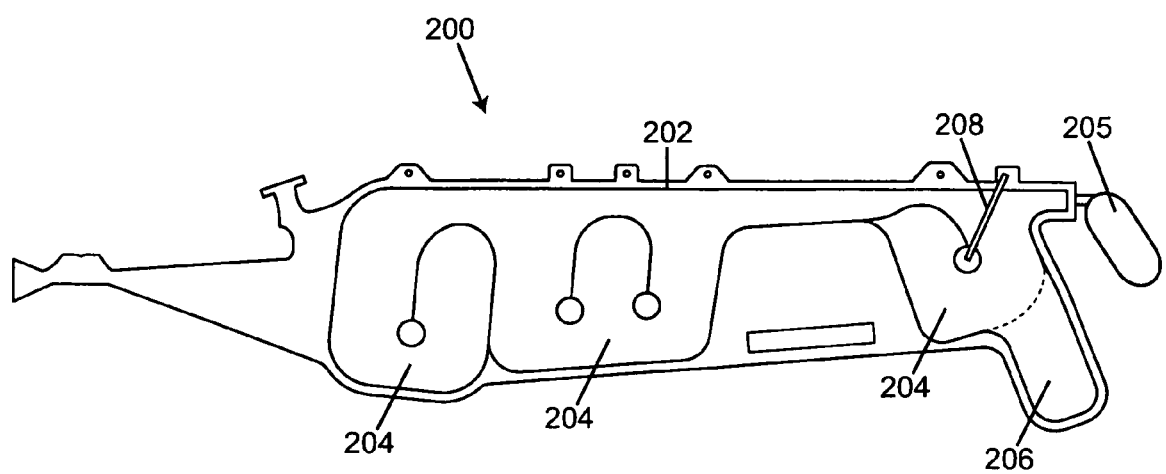
FIG. 2 is a side elevation view of the side curtain airbag of FIG. 1 according to an exemplary embodiment.

FIG. 2 shows a side curtain airbag 200 according to an exemplary embodiment in a deflated state. The airbag 200 includes a main body 202 with multiple chambers 204 that are disposed between the passenger and the side of the vehicle at approximately head height when the airbag 200 is deployed. An inflator or gas generator 205, for example a conventional pyrotechnic inflator or stored gas inflator, supplies gas for inflation/deployment of the airbag 200. During a vehicle crash or rollover event, the inflator 205 is activated to supply pressurized gas to inflate the chambers 204. The inflation gas enters the airbag 200 and drives the cushion chambers 204 away from the storage position and downward into the deployed position.

The airbag 200 further includes an extended portion 206. The extended portion 206 is generally an elongated body that is configured to offer additional restraint or protection for the vehicle occupant by providing lower inflated coverage to the occupant's torso, shoulder, and/or arm. In a side impact, the extended portion 206 cushions the occupant's torso from the vehicle door and side structures. The extended portion 206 is coupled to the main body 202 of the airbag cushion and is deployed from the vehicle's roof rail in a generally downward direction. Control of the deployment trajectory and timing facilitates correct positioning of the extended portion 206 between the occupant's torso and the side of the vehicle.

Figure 7:
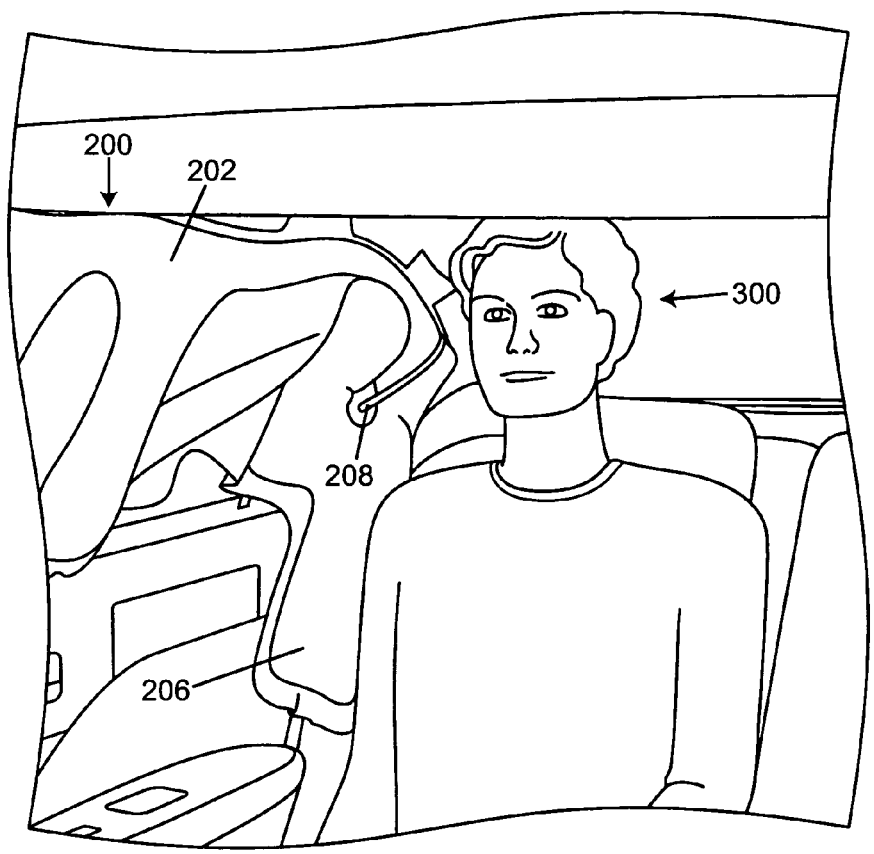
FIG. 7 is an isometric view of the interior of a vehicle showing the side curtain airbag deployed between an occupant and the side of the vehicle according to an exemplary embodiment.
Figure 8:
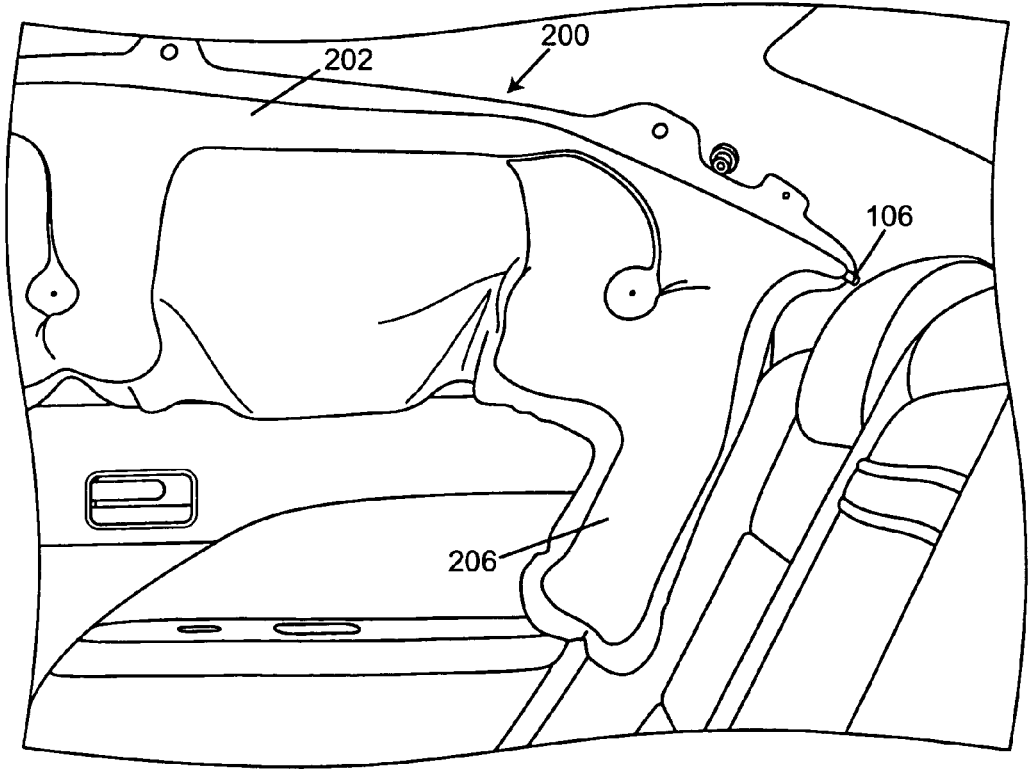
FIG. 8 is a side elevation view of the interior of a vehicle showing the side curtain airbag deployed between an occupant's seating location and the side of the vehicle with the tether not shown for clarity according to an exemplary embodiment.

The rapid rate of airbag inflation, coupled with the consequences of an occupant striking the deployed cushion or chamber 204, can sometimes present difficulties in maintaining the cushion between the occupant and the window/door of the vehicle. It is desirable to provide a tensioning force on the chambers 204 to prevent the chambers 204 from being displaced (e.g., by the occupant, due to inertial forces from the crash or rollover, etc.). According to an exemplary embodiment, the tensioning force is provided by a tether 208 coupled to the inboard or interior side of the airbag chambers 204, as seen best in FIGS. 2, 3, and 7. The tether 208 (e.g., strap, cord, strip leash, etc.) may be a relatively narrow strip of material having a length that is less than the height of the main chamber 202 or chambers 204.

Figure 3:
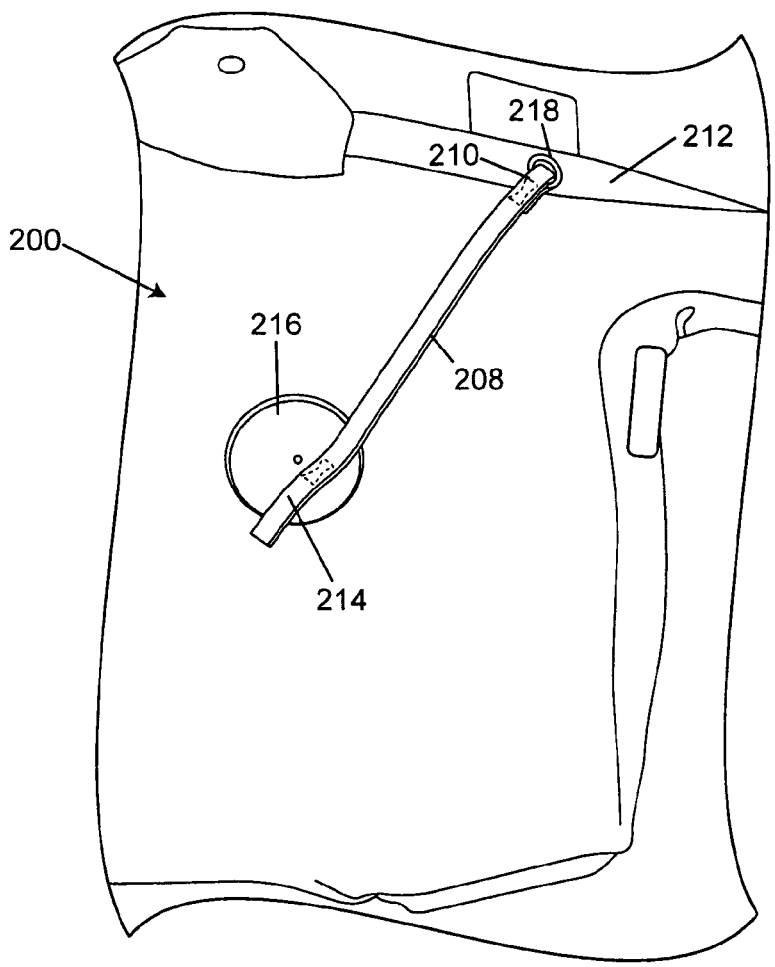
FIG. 3 is a side elevation view of the rear portion of the side curtain airbag of FIG. 1 with the extended portion folded within the main body according to an exemplary embodiment.

Referring also to FIG. 3, a first end 210 of the tether 208 is coupled to the vehicle frame 212 proximate to the top edge of the airbag 200 (e.g., along the roof rail and/or along the C-pillar). The tether 208 traverses across at least one inflatable chamber 204 of the curtain airbag 200. The second end 214 of the tether is coupled to a lower, inboard portion 216 of the curtain airbag 200. The first end 210 of the tether 208 includes an anchoring device 218 to allow the tether 208 to be secured to the vehicle frame 212 (such as a body-side sheet metal of the vehicle) or to the airbag 200 (such as a bracket on the airbag module). During deployment, the fixed length of the tether 208 is effectively shortened by the inflation of the curtain airbag chambers 204 across which it is placed. This shortening action controls the deployment angle of the deploying curtain airbag 200 with extended torso protection or restraint to ensure proper positioning between the occupant and the vehicle side structure. Without the tether 208, the extended portion 206 of the airbag may have a greater chance of deploying out the vehicle window and/or coming to rest on the beltline of the vehicle.

Figure 4:
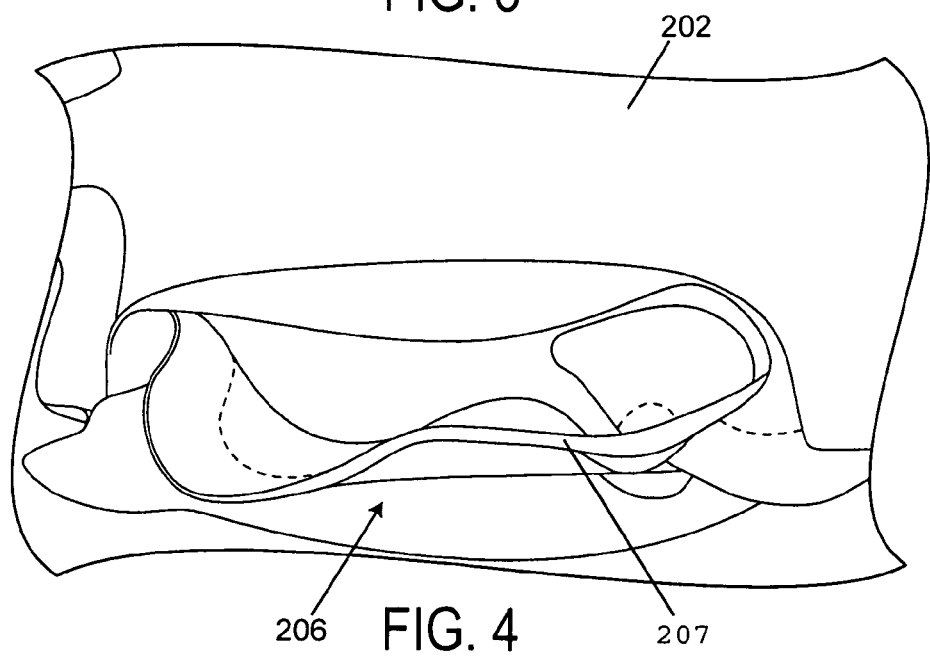
FIG. 4 is an end view of the extended portion of the side curtain airbag of FIG. 3 showing the extended portion tuck folded within the main body according to an exemplary embodiment.

The airbag cushion 204 is stored along the roof rail with a combination of folds and rolls. The configuration of the fold used is generally a combination of a tuck fold, outboard roll (towards an exterior of the vehicle), and Z-fold. For example, the extended portion 206 of the airbag 200 is folded within itself and tucked internally (e.g., turned inside out) within the interior of the main body 202 (e.g., the head protecting chambers) of the curtain airbag 200. A portion (e.g., half) 207 of this internally tucked portion may be pulled back through itself to form an inverted "half-tuck", as shown in FIG. 4. The tuck fold helps facilitate correct deployment of the extended portion 206. With a fold other than a tuck fold, the extended portion 206 may have a greater chance of being deployed too far inboard or too far outboard from the desired position.

Figure 5:
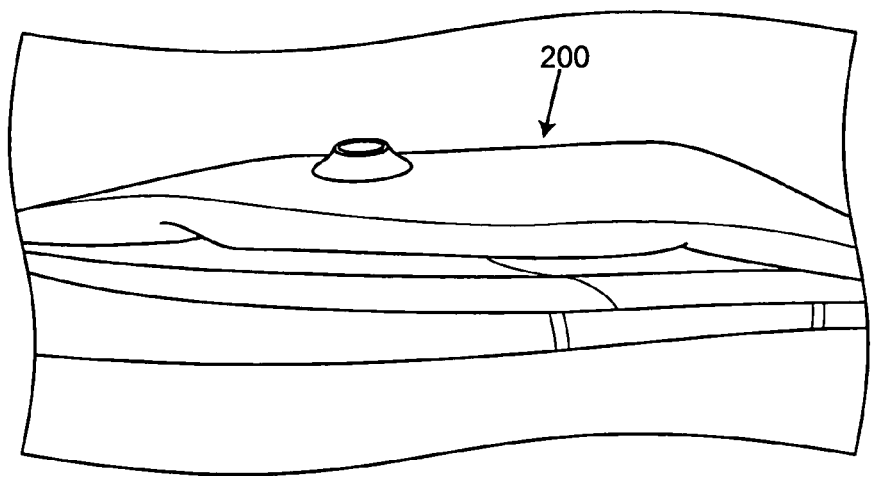
FIG. 5 is an end view of the top portion of the airbag cushion showing a Z fold according to an exemplary embodiment.

The majority of the curtain airbag 200 (including main body 202 and tucked extension 206) is then rolled up in an outboard fashion. A top portion of the curtain airbag 200 is folded in a Z-pattern or "Z-folded," as shown in FIG. 5. While the embodiment show in FIGS. 1-8 includes an extended portion 206 that is packed with a "half-tuck" fold, it should be understood that other similar folds may be used and the ratio of the portion of the extended portion 206 that is at least partially tucked into the portion of the main body 202 or that is tucked and then pulled back out may be varied. For example, the extended portion 206 may be fully tucked in, or may be folded with another ratio such as a ¼ tuck, a ¾ cut or any other suitable ratio. It is also noted that according to various exemplary embodiments, the airbag 200 may be folded into a Z-pattern before or after tucking the extended portion 206 and rolling the lower portion of the airbag 200.

Figure 6:
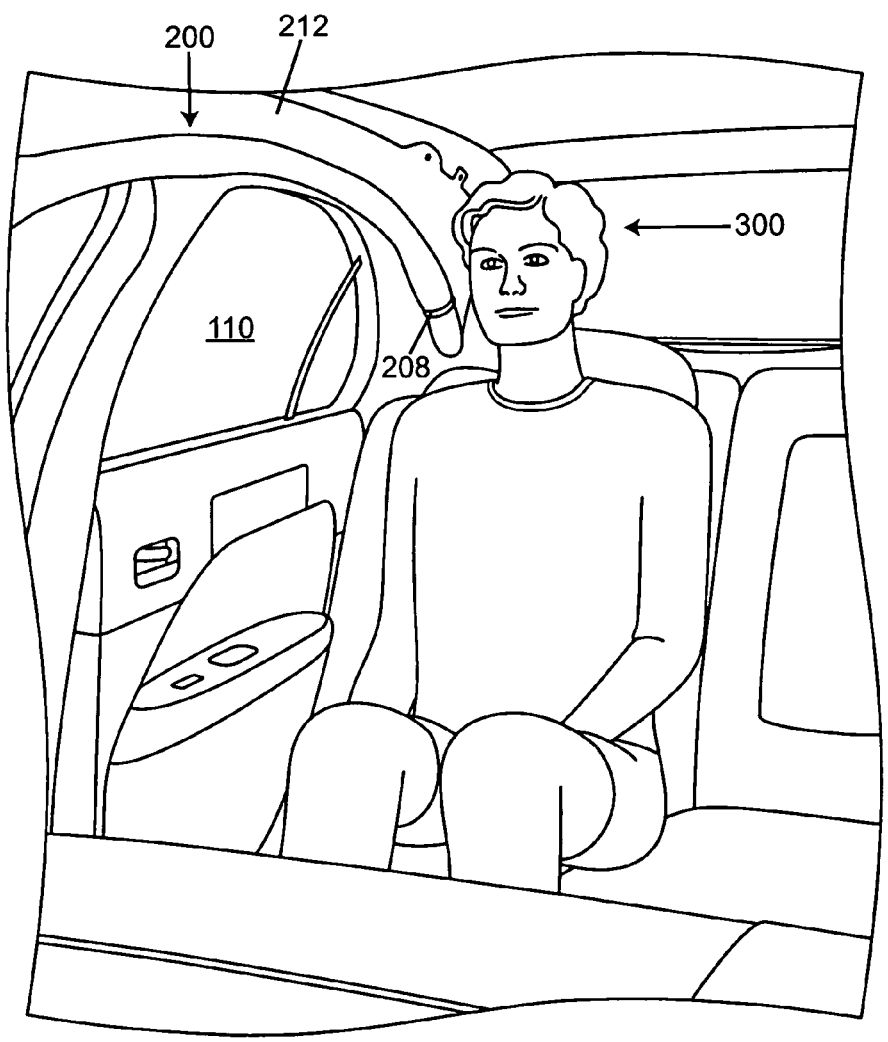
FIG. 6 is an isometric view of the interior of a vehicle showing the side curtain airbag stowed along the vehicle roof rail according to an exemplary embodiment.

Referring to FIG. 6, the airbag 200 is stowed along the roof rail 212, above the side windows 110 of the vehicle. During a vehicle crash or rollover event, the inflator (e.g., inflator 106) is activated to supply pressurized gas to inflate the airbag 200. The inflation gas enters the cushion and drives it away from the storage position and downward into the deployed position shown in FIGS. 7 and 8. According to various exemplary embodiments, adequate pressure may be maintained in the airbag 200 throughout the duration of deployment and subsequent impact between an occupant 300, the airbag 200, and the vehicle side structure to restrain the occupant 300 from colliding with the vehicle side structure with excessive force. However, the high-pressure gas may escape through holes in the airbag fabric created by the sewing or weaving process as discussed above. According to some exemplary embodiments, a silicon bead may be provided at the sewn seams of the chambers 204 of the curtain airbag 200. The silicon bead may provide an at least partially air-tight barrier, preventing or reducing loss of the inflation gas. The addition of the silicon bead may help ensure that the internal pressures achieved during deployment offer substantial restraint of the occupant 300.

The tether 208, the extended portion 206, the tuck fold of the extended portion 206, and the silicon bead may cooperate to deploy the curtain airbag 200 correctly (e.g., with a trajectory that allows the airbag to position itself properly between the occupant and the vehicle structure, with an adequate fill pressure, in a suitable timeframe, etc.). When deployed correctly, the airbag 200 may help restrain the occupant 300 within the vehicle 100 and reduce the chance of the occupant 300 being ejected from the vehicle 100 through the window 110 in a side impact or rollover.

Figure 9:
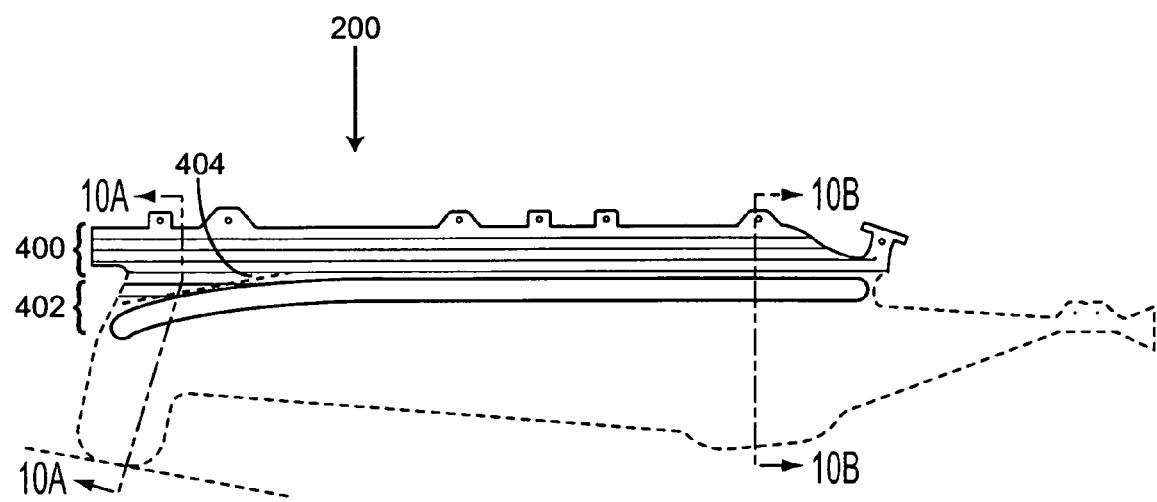
FIG. 9 is a side elevation view of the side curtain airbag of FIG. 1 in a storage position according to an exemplary embodiment.
Figure 10A:
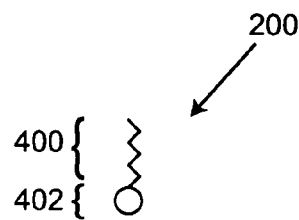
FIG. 10A is a first cross-section view of the side curtain airbag of FIG. 9 in a storage position according to an exemplary embodiment.
Figure 10B:
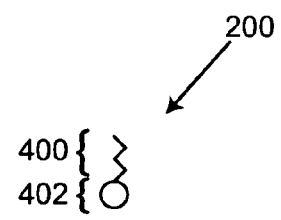
FIG. 10B is a second cross-section view of the side curtain airbag of FIG. 9 in a storage position according to an exemplary embodiment.

Referring to FIG. 9, the airbag 200 is further illustrated according to various exemplary embodiments. A top portion 400 of airbag 200 is folded into Z-shaped patterns or folds while a lower portion 402 of airbag 200 (including tucked extended portion 206 and main body 202) is rolled. Referring also to FIGS. 10A and 10B, cross-sections along lines A and B of FIG. 9 of the airbag 200 are shown, respectively.

According to one exemplary embodiment, the lower portion 402 may be rolled in an inboard direction. According to another exemplary embodiment, the lower portion 402 may be rolled in an outboard direction. According to other exemplary embodiments, a left part of the lower portion 402 including the tucked extended portion 206 may be rolled in an inboard direction while the rest of the main body 202 is rolled in an outboard direction.

Because the curtain airbag 200 is deployed from the vehicle's roof rail 212 in a downward direction, control of the deployment trajectory and timing to a deployment position affects airbag performance. According to various exemplary embodiments, at least a part of the lower portion 402 (e.g., a region near the extended portion 206) may be rolled generally parallel with the ceiling and at an angle 404 with the vehicle frame (e.g., frame 212) that is substantially the same as the angle of the ceiling with the frame. According to some exemplary embodiments, the lower portion 402 may be rolled at an angle of between about 10 and 20 degrees respective to the frame. According to one exemplary embodiment, the lower portion 402 may be rolled at about a 15-degree angle respective to the frame.

Without matching the angle of the ceiling with respect to the vehicle frame, an extension of the curtain airbag 200 may not accurately deploy or may get hung up on the beltline of the vehicle, not offering additional protection to the occupant's torso. If the airbag 200 includes folds other than the combined roll (e.g., inboard roll) at an angle matching the ceiling and Z-folds, the extension 206 may deploy too far inboard or too far outboard from the desired position.

According to one exemplary embodiment. The airbag may include a combination of an inboard roll at an angle matching the ceiling angle and Z-folds. The extended portion 206 of the airbag may be first folded with an inboard roll at a vehicle angle matching the angle of the ceiling with respect to the vehicle frame 212 with about 1.5 Z-folds added at the top portion 400 above extended portion 206. The majority of the curtain airbag 200 can then be rolled up in an outboard fashion. Finally, the top portion 400 of the remainder of the curtain airbag 200 is Z-folded.

As illustrated in FIGS. 10A and 10B, the part of the lower portion 402 that is rolled at an angle 404 may include more Z-folds than the remaining part of the lower portion (e.g., about 2 folds) because it is further from the vehicle frame. It is noted that in other exemplary embodiments, more or fewer than 1.5 or 2 Z-folds may be used.

According to an exemplary embodiment, a combined inboard roll of the extended portion 206 at an angle 404 matching that of the ceiling and an outboard roll of the rest of the main body 202 may increase the likelihood that the deploying curtain airbag 202 and extended portion 206 has a trajectory that allows the airbag to position itself properly between the occupant (e.g., occupant 300) and the vehicle structure in a suitable timeframe after a collision.

For purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

The construction and arrangement of the elements of the curtain airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the system may be constructed from any of a wide variety of materials that provide sufficient strength or durability, including any of a wide variety of moldable plastic materials in any of a wide variety of colors, textures and combinations. Other substitutions, modifications, changes and omissions may be made in the design, operating conditions and arrangement of the exemplary embodiments.

What is claimed is:

1. An airbag module for use in a vehicle, comprising:
    a gas generator; and
    a side airbag coupled to the gas generator and configured to deploy upon receiving gas from the gas generator, the side airbag comprising:
        a main body extending along a ceiling of the vehicle when in a storage position and configured to restrain a head of a vehicle occupant when the airbag is deployed; and
        an extended portion extending from the main body in a downwards direction and configured to restrain at least a portion of a torso of the vehicle occupant when the airbag is deployed,
    wherein the extended portion is at least partially tucked into the main body and the airbag is folded in a Z pattern and rolled when the airbag is installed and in the storage position, wherein the tuck of the extended portion and the folds of the main body control the deployment angle of the main body and extended portion, and
    wherein the extended portion is rolled in an inboard direction and the main body is rolled in an outboard direction.

2. The airbag module of claim 1, wherein the extended portion is tucked into the main body by folding the extended portion within itself and then pulling a portion of the extended portion back through itself to form an inverted half-tuck.

3. The airbag module of claim 1, further comprising a tether coupled to an inboard side of the main body and to a vehicle frame or to another portion of the airbag module, the tether configured to control the deployment angle of the main body and extended portion.

4. The airbag module of claim 1, wherein at least a portion of the airbag is rolled at an angle matching the angle between the vehicle ceiling and a vehicle frame.

5. The airbag module of claim 4, wherein the angle is between 10 and 20 degrees.

6. The airbag module of claim 1, wherein the main body includes at least one chamber, and wherein a silicon bead is added at the sewn seams of the at least one chamber.

7. A side airbag for use in a vehicle, comprising:
   a main body extending along a ceiling of the vehicle when in a storage position and configured to restrain a head of a vehicle occupant when the airbag is deployed;
   an extended portion extending from the main body in a downwards direction and configured to restrain at least a portion of a torso of the vehicle occupant when the airbag is deployed, and
   a tether coupled to an inboard side of the main body and to a vehicle frame or to another portion of the airbag, the tether configured to control the deployment angle of the main body and extended portion,
   wherein the extended portion is at least partially tucked into the main body and the airbag is folded in a Z pattern and rolled in an inboard or outboard direction when the airbag is installed and in the storage position, wherein the tuck of the extended portion and the folds of the main body further control the deployment angle of the main body and extended portion, and
   wherein the extended portion is rolled in an inboard direction and the main body is rolled in an outboard direction.

8. The side airbag of claim 7, wherein at least a portion of the airbag is rolled at an angle matching the angle between the vehicle ceiling and a vehicle frame.

9. The side airbag of claim 8, wherein the angle is between 10 and 20 degrees.

10. The side airbag of claim 7, wherein a silicon bead is added at the sewn seams of the airbag chambers.

11. A side airbag for use in a vehicle, comprising:
    a main body extending along a ceiling of the vehicle when in a storage position configured to restrain a head of a vehicle occupant when the airbag is deployed; and
    an extended portion extending from the main body in a downwards direction and configured to restrain at least a portion of a torso of the vehicle occupant when the airbag is deployed,
    wherein the extended portion is at least partially tucked into the main body and the airbag is folded in a Z pattern and rolled when the airbag is installed and in the storage position, wherein at least a portion of the airbag is rolled at an angle matching the angle between the vehicle ceiling and a vehicle frame, and
    wherein the extended portion is rolled in an inboard direction and the main body is rolled in an outboard direction.

12. The side airbag of claim 11, wherein the angle is between 10 and 20 degrees.

13. The side airbag of claim 11, further comprising a tether coupled to an inboard side of the main body and to a vehicle frame or to another portion of the airbag, the tether configured to control the deployment angle of the main body and extended portion.

14. The side airbag of claim 11, wherein a silicon bead is added at the sewn seams of the airbag chambers.

15. The airbag module of claim 1, wherein the extended portion is coupled to the main body such that the extended portion is in fluid communication with the main body.

* * * * *